(12) United States Patent
Rho

(10) Patent No.: US 8,530,115 B2
(45) Date of Patent: Sep. 10, 2013

(54) COLOR FILTER ARRAY PANEL, LIQUID CRYSTAL DISPLAY HAVING THE SAME, AND MANUFACTURING METHOD THEREOF

(75) Inventor: Soo-Guy Rho, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 1496 days.

(21) Appl. No.: 11/404,269

(22) Filed: Apr. 12, 2006

(65) Prior Publication Data

US 2006/0232729 A1    Oct. 19, 2006

(30) Foreign Application Priority Data

Apr. 13, 2005   (KR) .................. 10-2005-0030673

(51) Int. Cl.
 *G02B 5/20*    (2006.01)
(52) U.S. Cl.
 USPC ............... 430/7; 427/162; 349/106; 349/114
(58) Field of Classification Search
 None
 See application file for complete search history.

(56) References Cited

U.S. PATENT DOCUMENTS

| 5,726,724 A | 3/1998 | Shirota et al. |
| 6,063,174 A * | 5/2000 | Shirota et al. ............. 106/31.27 |
| 6,399,257 B1 | 6/2002 | Shirota et al. |
| 6,830,856 B2 | 12/2004 | Tsai et al. |
| 2002/0036730 A1 * | 3/2002 | Baek et al. .................... 349/106 |
| 2005/0036086 A1 * | 2/2005 | Kim et al. ..................... 349/106 |
| 2005/0174511 A1 * | 8/2005 | Sugawara et al. ............ 349/106 |
| 2007/0139587 A1 * | 6/2007 | Chen et al. ................... 349/106 |
| 2008/0030658 A1 * | 2/2008 | Matsuhita .................... 349/106 |

FOREIGN PATENT DOCUMENTS

| JP | 2000-187206 | 7/2000 |
| JP | 2000-258622 | 9/2000 |
| JP | 2002-122723 | 4/2002 |
| JP | 2002-169182 | 6/2002 |
| JP | 2003-107231 | 4/2003 |
| JP | 2003-295180 | 10/2003 |
| KR | 1020000048021 | 7/2000 |
| KR | 1020010062353 | 7/2001 |
| KR | 1020010070396 | 7/2001 |
| KR | 2003-0020396 | 8/2003 |
| KR | 2004-0014304 | 2/2004 |
| WO | WO 03/104861 A1 * | 12/2003 |

* cited by examiner

*Primary Examiner* — John A. McPherson
(74) *Attorney, Agent, or Firm* — Cantor Colburn LLP

(57) ABSTRACT

A method of manufacturing a color filter array panel is provided. The method includes forming light-blocking members having a plurality of openings on a substrate, forming transparent organic layers within the openings, forming color filters by spraying ink for the color filters in the openings, and forming a common electrode on the color filters and the light-blocking members. The transparent organic layers are formed in reflective areas, and the color filters are formed by using an inkjet printing system so that it is possible to planarize the color filters and improve color characteristics of the reflective areas.

32 Claims, 10 Drawing Sheets

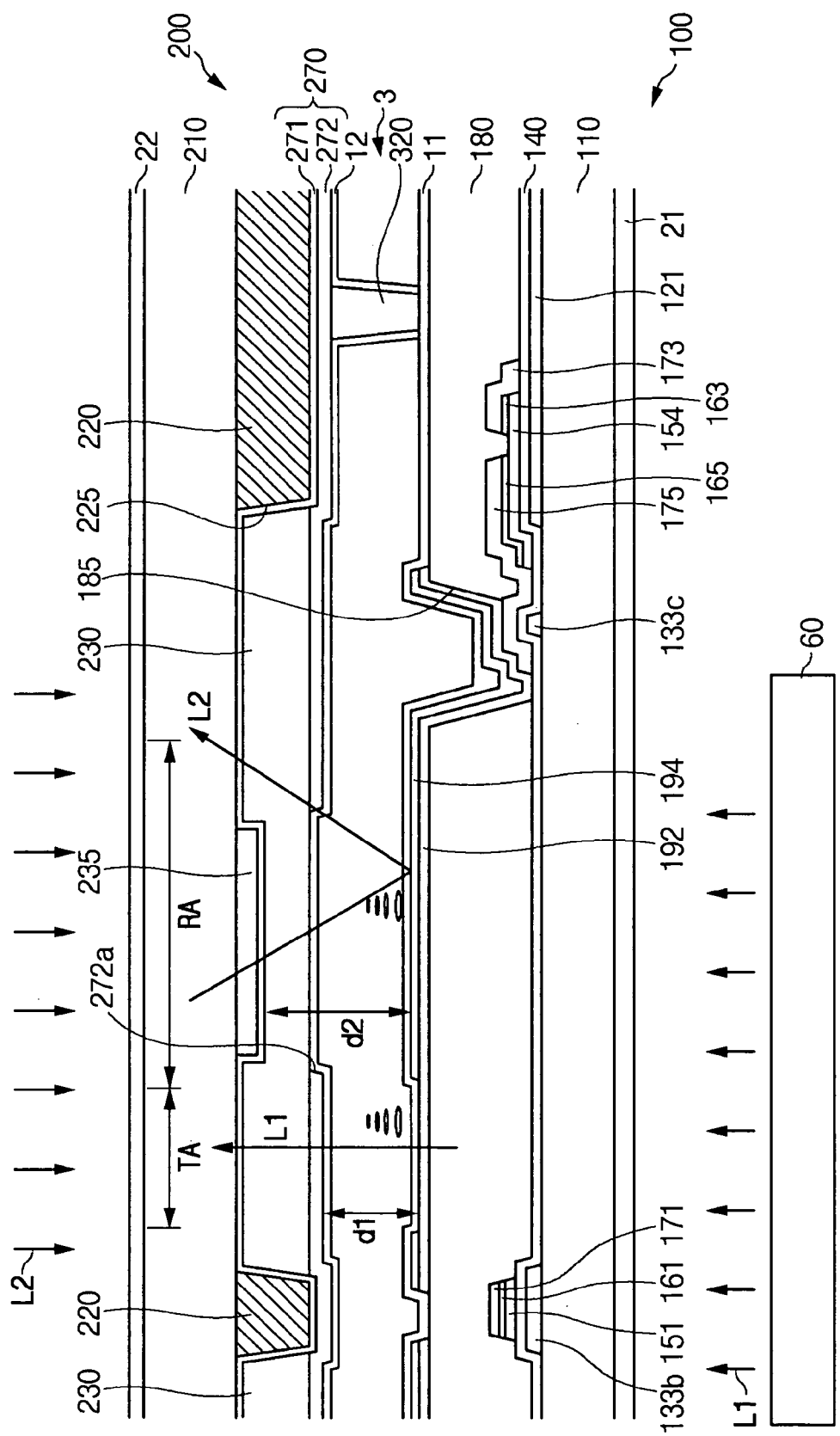

COLOR FILTER ARRAY PANEL, LIQUID CRYSTAL DISPLAY HAVING THE SAME, AND MANUFACTURING METHOD THEREOF

This application claims priority to Korean Patent Application No. 2005-0030673, filed on Apr. 13, 2005, and all the benefits accruing therefrom under 35 U.S.C. §119, and the contents of which in its entirety are herein incorporated by reference.

BACKGROUND OF THE INVENTION (a) Field of the Invention

The present invention relates to a color filter array panel, a liquid crystal display having the color filter array panel, and a method of manufacturing the color filter array panel.

(b) Description of the Related Art

A liquid crystal display (LCD), which is one of the most widely used flat panel display apparatuses, includes two panels having electric field generating electrodes such as pixel electrodes and a common electrode, and a liquid crystal layer interposed therebetween. The LCD displays an image by applying a voltage to the electric field generating electrodes, which generates an electric field in the liquid crystal layer to determine alignment of liquid crystal molecules in the liquid crystal layer to control polarization of incident light.

In general, an LCD includes two panels on which the electric field generating electrodes are disposed. A plurality of pixel electrodes is arrayed in a matrix on one panel, and a single common electrode is disposed over the other panel. When individual voltages are applied to the pixel electrodes, the image is formed on the LCD. In addition, in order to display the image, thin film transistors, data lines, and gate lines are provided. The thin film transistors, that is, switching devices for switching the voltages applied to the pixel electrodes, are connected to the pixel electrodes. The gate lines for transmitting signals to control the thin film transistors and the data lines for transmitting voltages to be applied to the pixel electrodes are disposed on the panel.

Color filters are formed by performing a spin- or slit-coating process on a photosensitive film, and then patterning the resulting product with a photolithography process. However, in the case where there is a patterned layer including patterned portions and non-patterned portions under the color filters, a step difference may occur at interface portions therebetween during the formation of the photosensitive film.

Depending on kinds of the light source used for the image display, the LCDs are divided into three types: transmissive, reflective, and transflective (transmissive-reflective). In transmissive LCDs, the pixels are illuminated from behind using a backlight. In reflective LCDs, the pixels are illuminated from the front using incident light originating from the ambient environment. Transflective LCDs combine transmissive and reflective characteristics. Under medium light conditions, such as an indoor environment, or under complete darkness conditions, these LCDs are operated in a transmissive mode, while under very bright conditions, such as an outdoor environment, they are operated in a reflective mode. The reflective and transflective LCDs are commonly used in small and medium size display devices.

In particular, in a transflective LCD, in order to obtain uniform color characteristics in transmissive and reflective areas, light holes are provided in the reflective areas so as to adjust colors. However, in this case, defects in the alignment of liquid crystal molecules may easily occur due to the step difference caused by the light holes.

SUMMARY OF THE INVENTION

According to an aspect of the present invention, there is provided a color filter array panel including: a substrate; light-blocking members that are disposed on the substrate and have a plurality of openings; transparent organic layers that are formed on the substrate and within the plurality of openings; color filters that are disposed on the substrate within the plurality of openings and on the transparent organic layers; and a common electrode that is disposed on the color filters and the light-blocking members, wherein the surface of the color filters is level with the surface of the light-blocking members.

In the above aspect of the present invention, convex-shaped members may be disposed on the transparent organic layers.

In addition, the transparent organic layers and the color filters may be made of a material with a hydrophilic type of characteristic, and the light-blocking member may be made of a material with a hydrophobic type of characteristic.

According to another aspect of the present invention, there is provided a liquid crystal display including a transistor array panel on which transparent electrodes and reflective electrodes are disposed, and a color filter array panel that includes: a substrate; light-blocking members that are disposed on the substrate and have a plurality of openings; transparent organic layers that are formed on the substrate and within the plurality of openings; color filters that are disposed on the substrate within the plurality of openings and on the transparent organic layers; and a common electrode that is disposed on the color filters and the light-blocking members, wherein the surface of the color filters is level with the surface of the light-blocking members. The liquid crystal display further includes a liquid crystal layer interposed between the transistor array panel and the color filter array panel, and the transparent organic layers are disposed at positions corresponding to the reflective electrodes.

In the above aspect of the present invention, the area of each transparent organic layer may be 1% to 90% of the area of each reflective electrode.

According to still another aspect of the present invention, a method of manufacturing a color filter array panel includes forming light-blocking members having a plurality of openings on a substrate, forming transparent organic layers within the plurality of openings, forming color filters by spraying ink for the color filters in the plurality of openings, and forming a common electrode on the color filters and the light-blocking members.

In the above aspect of the present invention, the ink for the color filters may be sprayed by using a plurality of nozzles of an inkjet head, and the nozzles may be disposed on a bottom surface of the inkjet head. A distance between adjacent positions at which the ink is sprayed through adjacent nozzles may be controlled to be equal to a pixel pitch on the substrate by adjusting a slant angle of the inkjet head.

In addition, convex-shaped members may be formed on the transparent organic layers.

According to a further aspect of the present invention, there is provided a color filter array panel including: a substrate; light-blocking members that are disposed on the substrate and have a plurality of openings; transparent organic layers that are formed on the substrate and within the plurality of openings; a first common electrode that is disposed on the substrate, the transparent organic layers, and the light-blocking members; color filters that are disposed on the first common electrode within the plurality of openings; and a second common electrode that is disposed on the color filters and the light-blocking members, wherein the surface of the color filters is level with the surface of the light-blocking members.

In the above aspect of the present invention, the second common electrode may have cut portions that are formed at positions corresponding to the transparent organic layers.

In addition, the transparent organic layers and the substrate may be made of a material with a hydrophilic type of characteristic, and the light-blocking members may be made of a material with a hydrophobic type of characteristic.

According to another aspect of the present invention, there is provided a liquid crystal display including a transistor array panel on which transparent electrodes and reflective electrodes are disposed, and a color filter array panel including: a substrate; light-blocking members that are disposed on the substrate and have a plurality of openings; transparent organic layers that are formed on the substrate and within the plurality of openings; a first common electrode that is disposed on the substrate, the transparent organic layers, and the light-blocking members; color filters that are disposed on the first common electrode within the plurality of openings; and a second common electrode that is disposed on the color filters and the light-blocking members, wherein the surface of the color filters is level with the surface of the light-blocking members. The liquid crystal display further includes a liquid crystal layer interposed between the transistor array panel and the color filter array panel, and the transparent organic layers are disposed at positions corresponding to the reflective electrodes.

In the above aspect of the present invention, the second common electrode may have cut portions that are formed at positions corresponding to the transparent organic layers, and the area of each transparent organic layer may be 1% to 90% of the area of each reflective electrode.

In addition, a distance between the reflective electrodes and the first common electrode disposed on the transparent organic layers may be larger than a distance between the transparent electrodes and the second common electrode.

According to a further aspect of the present invention, a method of manufacturing a color filter array panel includes forming light-blocking members having a plurality of openings on a substrate; forming transparent organic layers within the plurality of openings; forming a first common electrode on the substrate, the transparent organic layers, and the light-blocking members; forming color filters by spraying ink for the color filters on the first common electrode within the openings; and forming a second common electrode on the color filters and the light-blocking members, wherein the surface of the color filters is level with the surface of the light-blocking members.

In the above aspect of the present invention, the ink for the color filters may be sprayed by using a plurality of nozzles of an inkjet head, and the nozzles may be disposed on a bottom surface of the inkjet head. A distance between adjacent positions at which the ink is sprayed through adjacent nozzles may be controlled to be equal to a pixel pitch on the substrate by adjusting a slant angle of the inkjet head.

BRIEF DESCRIPTION OF THE DRAWINGS

The present invention will become more apparent by describing in detail exemplary embodiments thereof with reference to the attached drawings, in which:

FIG. 11 is a cross-sectional view showing a liquid crystal display according to a third embodiment of the present invention.

DETAILED DESCRIPTION OF THE PREFERRED EMBODIMENTS

Figure 1:
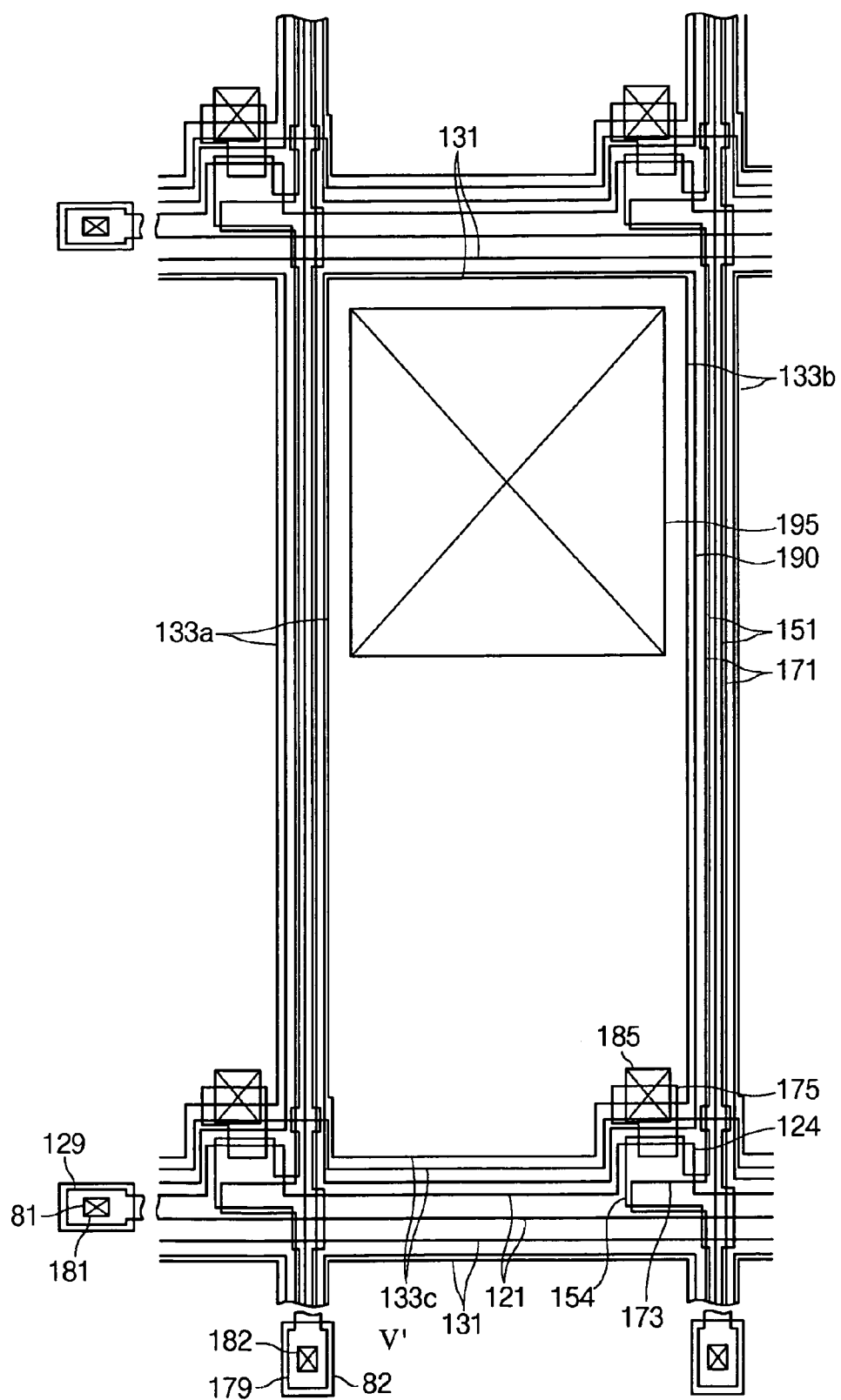
FIG. 1 is a layout view showing a transistor array panel for a transflective liquid crystal display according to a first embodiment of the present invention.

Hereinafter, exemplary embodiments of the present invention will be described in detail with reference to the attached drawings such that the present invention can be easily put into practice by those skilled in the art. However, the present invention may be implemented in various aspects. The present invention is not limited to the embodiments described hereinafter.

In the drawings, thicknesses are enlarged for the purpose of clearly illustrating layers and areas. In addition, like elements are denoted by like reference numerals in the whole specification. If it is mentioned that a layer, a film, an area, or a plate is placed on a different element, it includes a case that the layer, film, area, or plate is placed right on the different element as well as a case that another element is disposed therebetween. On the contrary, if it is mentioned that one element is placed right on another element, it means that no element is disposed therebetween.

Now, a color filter array panel and a liquid crystal display (LCD) having the same according to embodiments to the present invention will be described in detail with reference to the attached drawings.

Figure 2:
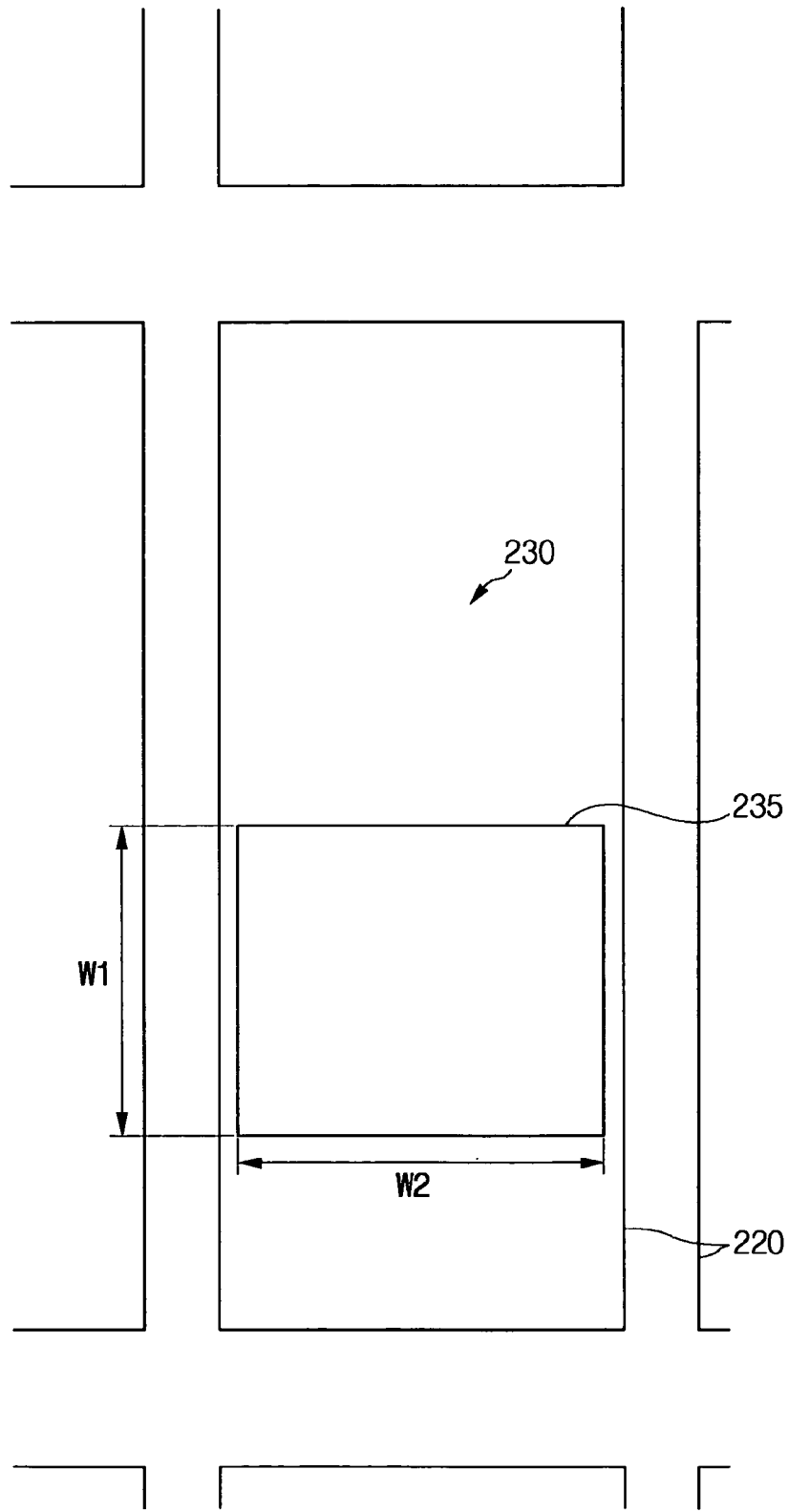
FIG. 2 is a layout view showing a color filter array panel for the transflective liquid crystal display according to the first embodiment of the present invention.
Figure 3:
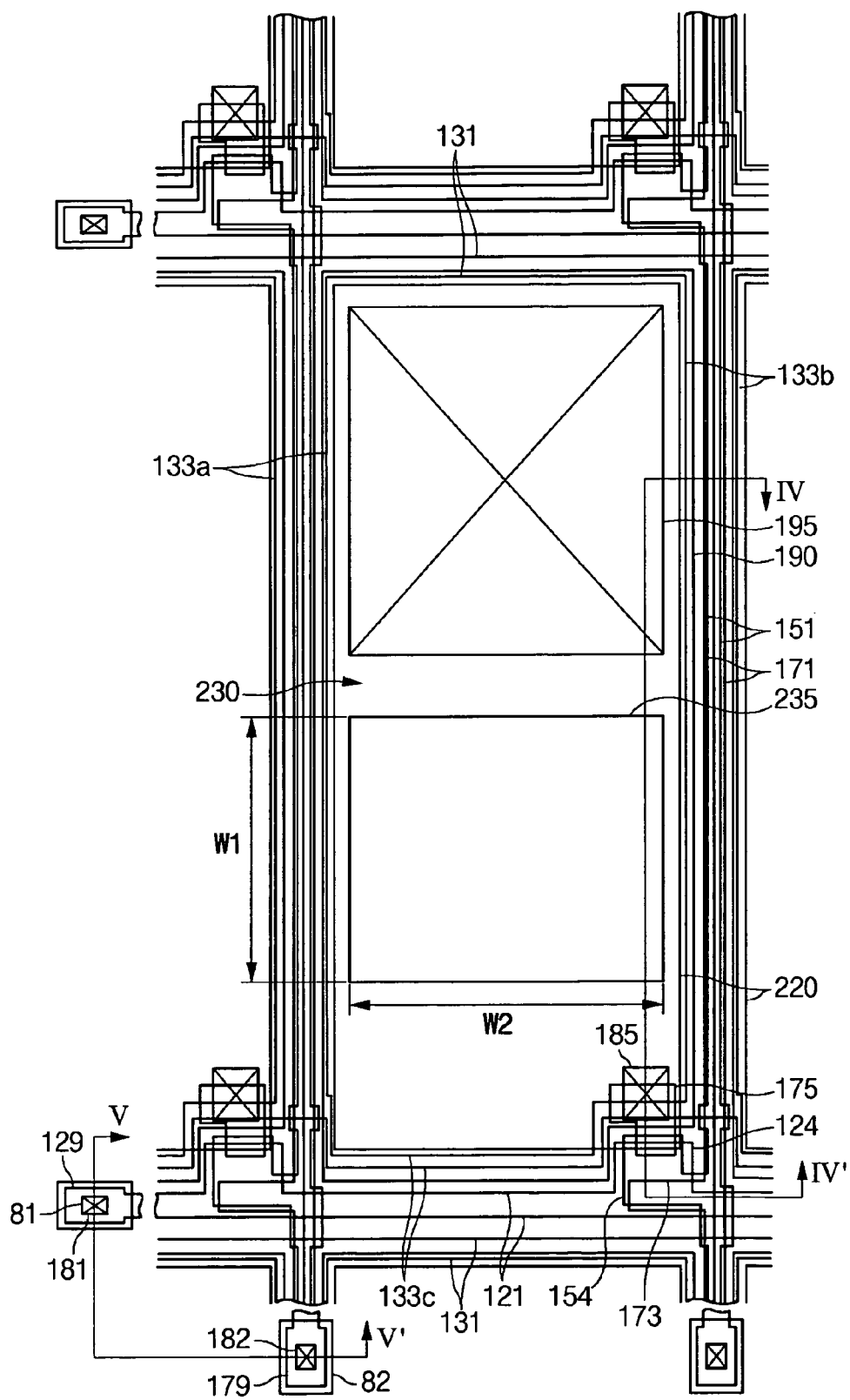
FIG. 3 is a layout view showing the transflective liquid crystal display according to the first embodiment of the present invention.
Figure 4:
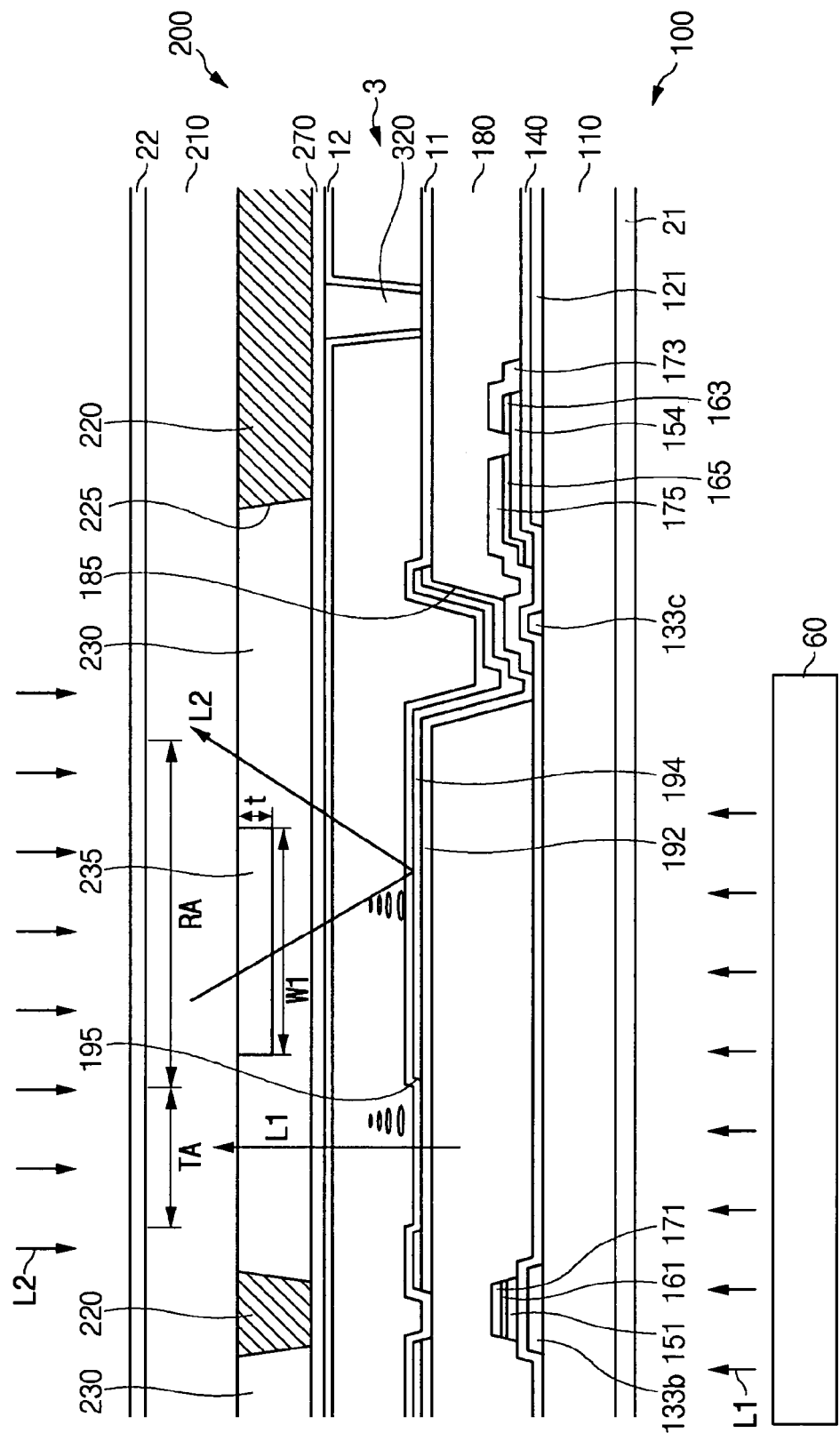
FIGS. 4 and 5 are cross-sectional views showing the transflective liquid crystal display taken along lines IV-IV' and V-V' of FIG. 3, respectively.
Figure 5:
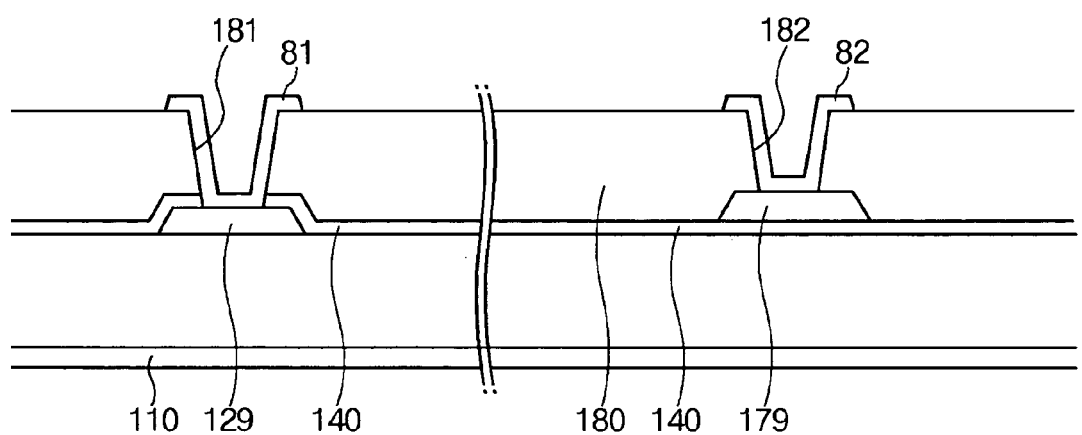

FIG. 1 is a layout view showing a transistor array panel for a transflective LCD according to the first embodiment of the present invention, FIG. 2 is a layout view showing a color filter array panel for the transflective LCD according to the first embodiment, and FIG. 3 is a layout view showing the transflective LCD according to the first embodiment. FIGS. 4 and 5 are cross-sectional views showing the transflective LCD taken along lines IV-IV' and V-V' of FIG. 3, respectively.

The LCD according to the first embodiment includes a transistor array panel 100, a color filter array panel 200, and a liquid crystal layer 3 interposed between the two panels 100 and 200.

Firstly, the transistor array panel 100 will be described in detail with reference to FIG. 1 and FIGS. 3 to 5.

A plurality of gate lines 121 and a plurality of storage electrode lines 131 are disposed on an insulating substrate 110 made of a transparent glass or plastic material.

The gate lines 121 for transmitting gate signals mainly extend in the transverse direction.

The gate lines 121 include a plurality of gate electrodes 124 that protrude upwardly, and end portions 129 that have wide areas for connection to other layers or external driver circuits. A gate driver circuit (not shown) that generates the gate signals may be mounted on a flexible printed circuit film attached to the substrate 110. Alternatively, the gate driver circuit may be directly mounted on the substrate 110, or it may be integrated in the substrate 110. In a case where the gate driver circuit is integrated in the substrate 110, the gate lines 121 extend to be directly connected to the gate driver circuit.

The storage electrode lines 131 mainly extend in the transverse direction, and include storage electrodes 133a and 133b that extend in the longitudinal direction from the storage electrode lines 131. The storage electrodes 133a and 133b that extend in the longitudinal direction are connected to each other by storage electrodes 133c that extend in the transverse direction and have curved portions therein. However, various shapes and arrangements may be used for the storage electrode lines 131.

The gate lines 121 and the storage electrode lines 131 may be made of an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), tantalum (Ta) or titanium (Ti). However, the gate lines 121 and the storage electrode lines 131 may be made of various metals or conductive materials.

In addition, side surfaces of the gate lines 121 and the storage electrode lines 131 are slanted with respect to a surface of the substrate 110, and the slant angle is in a range of about 30° to about 800.

A gate insulating layer 140 made of a silicon nitride ($SiN_x$), a silicon oxide ($SiO_x$) or the like is formed on the gate lines 121 and the storage electrode lines 131.

A plurality of semiconductor stripes 151 made of hydrogenated amorphous silicon (abbreviated to a-Si) or polysilicon are formed on the gate insulating layer 140. The semiconductor stripes 151 mainly extend in the longitudinal direction and include a plurality of protrusions 154 that extend toward the gate electrodes 124. In addition, the widths of the semiconductor stripes 151 are enlarged at regions near the gate lines 121 and the storage electrode lines 131 to cover the entire areas thereof.

A plurality of line-shaped ohmic contacts 161 and island-shaped ohmic contacts 165 are formed on the semiconductor stripes 151. The ohmic contacts 161 and 165 may be made of silicide or an n+ hydrogenated amorphous silicon that is heavily doped with n-type impurities such as phosphorus (P). The line-shaped ohmic contacts 161 include a plurality of the protrusions 163. Each pair of a protrusion 163 and an island-shaped ohmic contact member 165 is disposed on a protrusion 154 of a semiconductor stripe 151.

Side surfaces of the semiconductor stripes 151 and the ohmic contacts 161 and 165 are also slanted with respect to the surface of the substrate 100, and the slant angle is in a range of about 30° to about 80°.

A plurality of data lines 171 and a plurality of drain electrodes 175 are formed on the ohmic contact members 161 and 165 and the gate insulating layer 140.

The data lines 171 for transmitting data signals mainly extend in the longitudinal direction to intersect the gate lines 121. In addition, the data lines 171 intersect the storage electrode lines 131 and overlap the storage electrodes 133a and 133b. The data lines 171 include a plurality of source electrodes 173 that protrude toward the gate electrodes 124 and end portions 179 that have wide areas for connection to other layers or external driver circuits. A data driver circuit (not shown) that generates the data signals may be mounted on a flexible printed circuit film attached on the substrate 110. Alternatively, the data driver circuit may be directly mounted on the substrate 110, or it may be integrated in the substrate 110. In a case where the data driver circuit is integrated in the substrate 110, the data lines 171 extend to be directly connected to the data driver circuit.

A drain electrode 175 is separated from a data line 171 and faces a source electrode 173 with a gate electrode 124 interposed therebetween.

One gate electrode 124, one source electrode 173, and one drain electrode 175 together with one protrusion 154 of one semiconductor stripe 151 constitute one thin film transistor. A channel of the thin film transistor is formed in the protrusion 154 between the source electrode 173 and the drain electrode 175.

Preferably, the data lines 171 and the drain electrodes 175 are made of molybdenum (Mo), a refractory metal such as chromium (Cr), tantalum (Ta), and titanium (Ti), or an alloy thereof. The data lines 171 and the drain electrodes 175 may have a multi-layered structure including a refractory metal layer (not shown) and a low-resistivity conductive layer (not shown). However, instead of the aforementioned materials, the data lines 171 and the drain electrodes 175 may be made of various metals or conductive materials.

Preferably, side surfaces of the data lines 171 and the drain electrodes 175 are also slanted with respect to the surface of the substrate 110 at an angle ranging from about 30° to about 80°.

The ohmic contacts 161 and 165 are interposed only between the underlying semiconductor stripes 151 and the overlying data lines 171 and drain electrodes 175, and have a function of reducing contact resistance therebetween. Although the widths of the semiconductor stripes 151 are smaller than those of the data lines 171 in most regions, the widths of portions where the gate lines 121 and the storage electrode lines 121 intersect each other are enlarged as described above. Therefore, the profile of surfaces at the intersections is smoothed, so that disconnection of the data lines 171 can be prevented. The semiconductor stripes 151 have exposed portions that are not covered by the data lines 171 and the drain electrodes 175, such as portions disposed between the source electrodes 173 and the drain electrodes 175.

A protective layer (passivation layer) 180 is formed on the data lines 171, the drain electrodes 175, and the exposed portions of the semiconductor stripes 151. The protective layer 180 is made of an inorganic insulating material such as a silicon nitride ($SiN_x$) or a silicon oxide ($SiO_x$), an organic insulating material, and a low-resistivity insulating material. Preferably, dielectric constants of the organic and low-resistivity insulating materials are 4.0 or less. Alternatively, the protective layer 180 may have a double-layer structure of a lower inorganic layer and an upper organic layer in order to sustain an excellent insulating property of the organic layer and to protect the exposed portions of the semiconductor stripes 151.

A plurality of contact holes 182 and 185 that expose end portions of the data lines 171 and the drain electrodes 175, respectively, are formed on the protective layer 180. A plurality of contact holes 181 that expose end portions of the gate lines 121 are formed on the protective layer 180 and the gate insulating layer 140.

A plurality of pixel electrodes 190 made of ITO or IZO and a plurality of contact assistants 81 and 82 are formed on the protective layer 180. Each of the pixel electrodes 190 includes a transparent electrode 192 made of ITO or IZO, and a reflective electrode 194 made of an opaque reflective metal such as chromium (Cr) and aluminum (Al) formed on the transparent electrode 192. The reflective electrode 194 formed on the transparent electrode 192 has a transmitting window 195 that exposes a portion of the transparent electrode 192.

The color filter array panel 200 includes reflective areas RA corresponding to the reflective electrode 194 and transmissive areas TA corresponding to the transmitting widows 195.

Each pixel electrode 190 is physically and electrically connected to a drain electrode 175 through a contact hole 185 and receives a data voltage applied by a drain electrode 175. The pixel electrodes 190 applied with the data voltage together with a common electrode 270 that is disposed in the color filter array panel 200 (sometimes referred to as a common electrode panel) and applied with a common voltage generates an electric field. The electric field determines alignment of liquid crystal molecules in a liquid crystal layer (not shown). Each pixel electrode 190 and the common electrode constitute a capacitor (hereinafter, referred to as a liquid crystal capacitor) that sustains the applied voltage after the thin film transistor turns off.

In order to increase voltage storage capacity, a storage capacitor is provided in parallel to each liquid crystal capacitor. The storage capacitor is constructed by overlapping a pixel electrode 190 and a storage electrode line 131. In order to increase storage capacitance, that is, electrostatic capacitance of the storage capacitor, the drain electrode 175 connected to the pixel electrode 190 is extended and enlarged to overlap storage electrodes 133*a*, 133*b*, and 133*c* provided to the storage electrode line 131, thereby decreasing the distance therebetween and increasing an overlapping area thereof.

The contact assistants 81 and 82 are connected to the end portions 129 of the gate lines 121 and the end portions 179 through the contact holes 181 and 182, respectively. Therefore, the contact assistants 81 and 82 have a function of securing adhesiveness of the exposed end portions 129 and 179 of the gate lines 121 and data lines 171 to external devices, and protecting the end portions 129 and 197.

In a case where a gate driver circuit is integrated in the transistor array panel 100, the contact assistants 81 have a function of connecting metal layers of the gate driver circuit to the gate lines 121. Similarly, in a case where a data driver circuit is integrated in the transistor array panel 100, the contact assistants 82 have a function of connecting metal layers of the data driver circuit to the data lines 171.

Now, the color filter array panel 200 (sometimes referred to as a common electrode panel) will be descried in detail with reference to FIGS. 2 to 4.

Light-blocking members 220 are formed on an insulating substrate 210 made of a transparent glass or plastic material. The light-blocking members 220 face the pixel electrodes 190 and have a plurality of openings 225 having the same shape as the pixel electrodes 190. Alternatively, the light-blocking members may have portions corresponding to the data lines 171 and portions corresponding to the thin film transistors.

Transparent organic layers 235 are formed within the openings 225 of the light-blocking members 220. Each of the transparent organic layers 235 has a shape of a rectangular parallelepiped having a longitudinal length W1, a transverse length W2, and a thickness t.

In a method of manufacturing a color filter array panel 200 according to the first embodiment of the present invention, a plurality of color filters 230 are formed on the substrate 210 and the transparent organic layers 235 by using an inkjet printing system. In addition, the color filters 230 are substantially disposed within the openings 225 defined by the light-blocking members 220. The color filters 230, which are disposed between the two adjacent data lines 171 and arrayed in the longitudinal direction, may be connected to each other to constitute a stripe. Each of the color filters 230 represents one of three primary colors of red, green, and blue.

An overcoat layer (not shown) made of an organic material may be formed on the color filters 230 and the light-blocking members 220 so as to protect the color filters 230 and planarize the surface thereof. The common electrode 270 made of a transparent conductive material is formed on the color filters 230 and the light-blocking members 220. The common electrode 270 is applied with the common voltage.

A plurality of spacers 320 is formed on the common electrode. The spacers 320 are preferably made of insulating material and props the panels 100 and 200 to form a cell gap therebetween.

Alignment layers 11 and 12 are coated on inner surfaces of the panels 100 and 200, respectively. In addition, polarizing plates 21 and 22 are disposed on outer surfaces of the panels 100 and 200, respectively. The alignment layers 11 and 12 may be vertical or horizontal alignment layers.

Transmittance axes of the polarizing plates 21 and 22 are perpendicular to each other, and one of the transmittance axes is parallel to the gate lines 121.

Phase retardation films (not shown) for compensating for retardation of the liquid crystal layer 3 may be interposed between the panels 100 and 200 and their polarizing plates 21 and 22. The phase retardation films have birefringence and have a function of inversely compensating for the birefringence of the liquid crystal layer 3. As the retardation film, a uniaxial or biaxial optical film may be used, and a negative uniaxial optical film may be preferable.

In addition to the polarizing plates 21 and 22 and the phase retardation films, the LCD includes a backlight unit 60 for supplying light to the panels 100 and 200 and the liquid crystal layer 3.

First light L1 that is generated by the backlight unit 60 passes through the transmissive areas TA and second light L2 that is externally supplied is reflected by the reflective areas RA, so that an image is displayed.

Now, a method of manufacturing the color filter array panel shown in FIGS. 2 to 4 according to the first embodiment of the present invention will be described in detail with reference to FIGS. 6A to 6C.

Figure 6A:
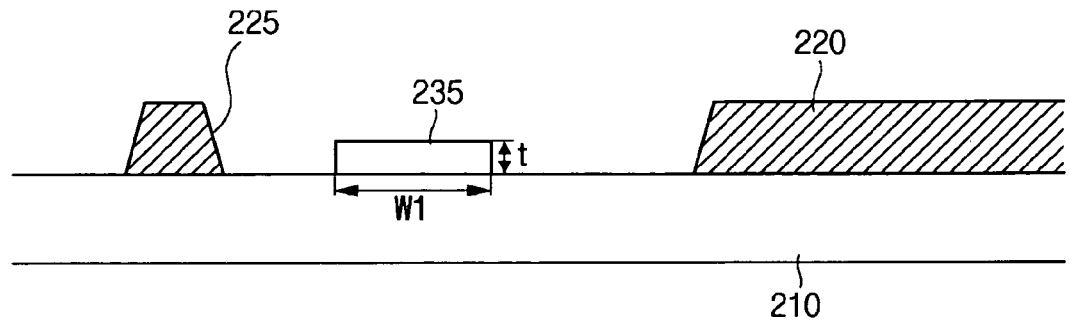
FIGS. 6A and 6C are cross-sectional views showing a series of steps of a method of manufacturing a color filter array panel according to the first embodiment of the present invention.
Figure 6B:
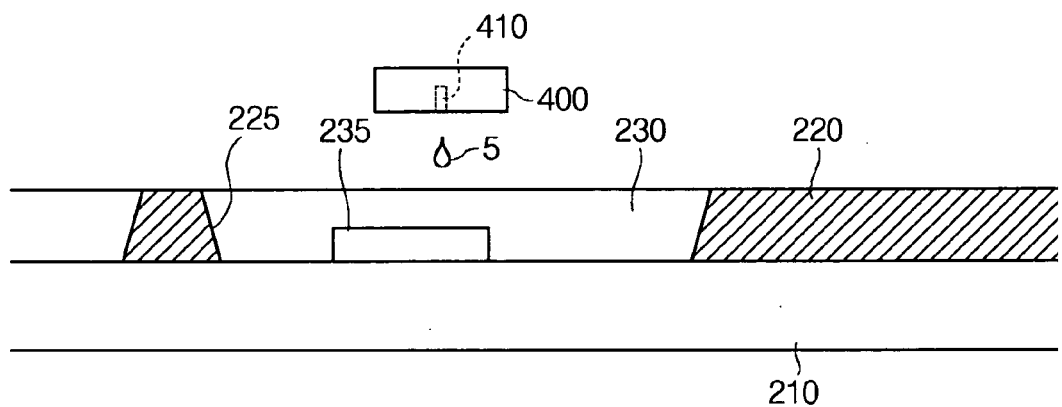
Figure 6C:
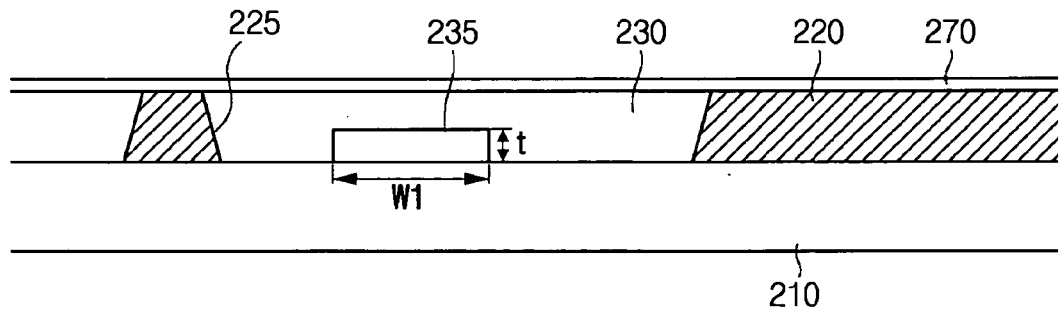

FIGS. 6A and 6C are cross-sectional views showing a series of steps of the method of manufacturing the color filter array panel according to the first embodiment of the present invention.

As shown in FIG. 6A, light-blocking members 220 (collectively referred to as a black matrix) are formed on an insulating substrate 210 made of a transparent glass or plastic material.

The light-blocking members 220 are formed by depositing a metal film such as a chromium film on a plastic insulating substrate 210 with a vacuum-deposition process, coating a photosensitive resin on the metal film, patterning the resulting product with a photolithography process, and etching the photosensitive film using the chromium film as an etch mask.

Alternatively, the light-blocking members 220 may be formed by depositing a polymer resin solution on an insulating layer 210 and performing a spin-coating process on the resulting product. In addition, the light-blocking members 220 may be formed by using various other well-known processes. The light-blocking members have a function of preventing light from leaking between adjacent pixels to improve luminance, and they serve as partition walls for enclosing ink for the color filters during the formation of the color filters.

The transparent organic layers 235 are formed on the same layer as a layer on which the light-blocking members 220 are formed. The transparent organic layers 235 formed within the openings 225 of the light-blocking members 220 are provided in order to compensate for a difference of color tones of the transmissive and reflective areas TA and RA.

Now, compensation for a difference of color tones of the transmissive and reflective areas TA and RA will be described in detail with reference to FIG. 4.

The second light L2 that is incident on the reflective area RA passes through the color filter 230 and is reflected by the reflective electrode 194, and the reflected light passes through the color filter 230 and emits outwardly. Therefore, the second light L2 passes through the color filter 23 twice. On the other hand, the first light L1 that is incident on the transmissive area TA passes through the color filter only once and emits outwardly.

Since the second light L2 that is reflected by the reflective area RA passes through the color filter 230 twice, the luminance of the second light L2 decreases in comparison to the first light L1 that passes through the color filter 230 once. On the other hand, since the second light L2 undergoes filtering twice, the chromaticity thereof increases in comparison to the first light L1. As a result, a difference of color tones between the first and second lights L1 and L2 passing through the reflective and transmissive areas RA and TA occurs.

In order to prevent the difference of color tones (chromaticity and luminance), the transparent organic layers 235 are formed on the reflective areas RA. The transparent organic layers 235 formed on the reflective areas RA increase the luminance of the second light L2 passing through the reflective areas RA. Since a larger amount of translucent white color is further included in the second light L2, the chromaticity thereof decreases. As a result, it is possible to compensate for the difference of color tones between the reflective and transmissive areas RA and TA.

In this case, the color tones of the reflective areas RA can be controlled by adjusting areas and thicknesses t of the transparent organic layers 235. Preferably, the area of each transparent organic layer 235 is controlled to be 1% to 90% of the area of each reflective area RA by adjusting the transverse and longitudinal lengths W1 and W2 of each transparent organic layer 235

Next, as shown in FIG. 6B, the color filters 230 are formed within the openings defined by the light-blocking members 220 by using an inkjet printing system. More specifically, when the inkjet head 400 has been carried to the positions corresponding to the openings 225, the ink 5, that is, liquid pigment pastes, corresponding to the colors of the red, green, and blue color filters is sprayed through nozzles 410 of the inkjet head 400 to fill the openings 225, so that the color filters 230 are completed.

In this case, some portion of the ink 5 that is sprayed into regions where the transparent organic layers 235 are to be formed can naturally flow into regions of the openings 225 where the transparent organic layers 235 are not formed. As a result, it is possible to planarize the regions where the transparent organic layers 235 are formed and the regions where the transparent organic layers 235 are not formed.

It is preferable that the transparent organic layers 235 and the ink 5 are made of materials with a hydrophilic type of characteristic, and that the light-blocking members 220 are made of a material with a hydrophobic type of characteristic. This is because the sprayed ink 5 needs to have wettability (or a spreading property) with respect to the transparent organic layers 235 and the substrate 210, but not with the light-blocking members 220.

In general, a material on which water easily spreads is called a hydrophilic material, and a material on which water does not easily spread is called a hydrophobic material.

When the color filters are formed by the inkjet printing system, the ink 5 is required to easily spread so as to be planarized. Therefore, preferably, the ink 5 is made of materials with a hydrophilic type of characteristic. In addition, in order to easily planarize the color filters 230 formed on the transparent organic layers 235, it is preferable that the transparent organic layers 235 are also made of materials with a hydrophilic type of characteristic.

In addition, when the color filters 230 are formed by using the inkjet printing system, the amount of ink 5 that is sprayed is larger than a volume defined by the light-blocking members 220. This is because the ink 5 contains about 50% to about 80% solvent that is evaporated during a drying process, and pigment paste and transparent resin contained in the ink 5 remain as a layer. If the light-blocking members 220 were made of a material with a hydrophilic type of characteristic, a large amount of the ink 5 would overflow into other pixel regions. So in order to prevent the overflow of the ink 5, the light-blocking members 220 are made of a material with a hydrophobic type of characteristic, which causes the ink 5 to form a meniscus before it is dried.

Each of the color filters 230 represents one of the primary colors of red, green, and blue. The color filters 230 that are disposed between two adjacent data lines 171 and arrayed in the longitudinal direction may be connected to each other to constitute a single stripe.

Next, as shown in FIG. 6C, a common electrode 270 is formed on the planarized color filters 230 and the light-blocking member 220.

Now, an inkjet printing system for forming the color filters in the method of manufacturing the color filter array panel according to the first embodiment of the present invention will be described with reference to FIGS. 7 to 9.

Figure 7:
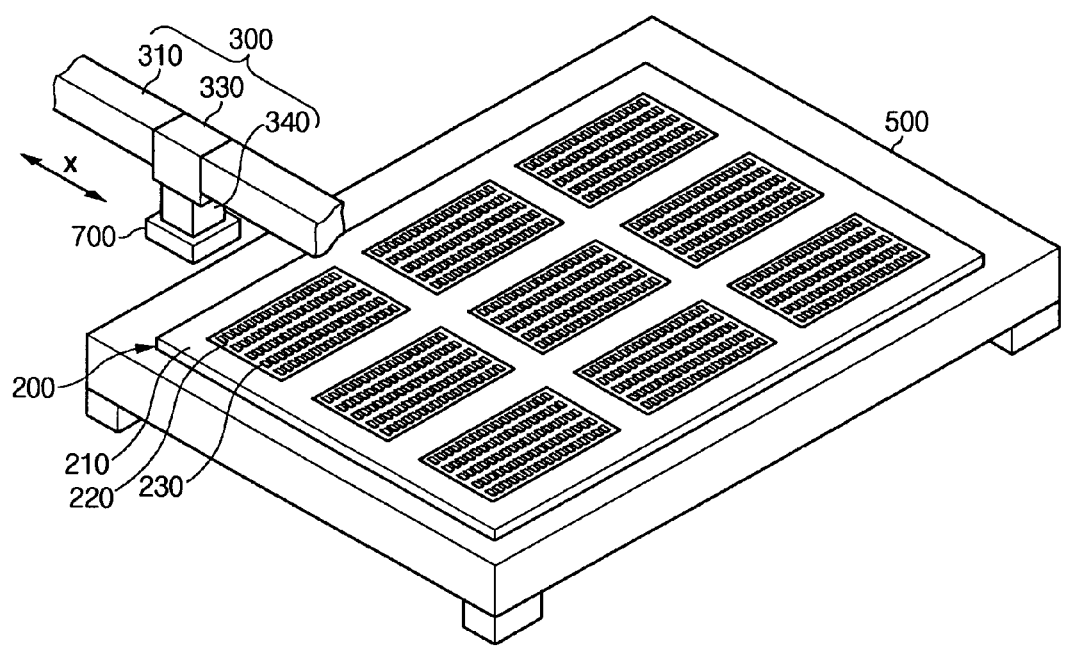
FIG. 7 is a perspective view showing an inkjet printing system for forming color filters in the method of manufacturing a color filter array panel according to the first embodiment of the present invention.

FIG. 7 is a perspective view showing an inkjet printing system for forming color filters in the method of manufacturing the color filter array panel according to the first embodiment of the present invention. FIG. 8 is a bottom view showing a head unit 700 of the inkjet printing system, and FIG. 9 is a schematic view for explaining a method of forming the color filters 230 by using an inkjet head 400.

Figure 8:
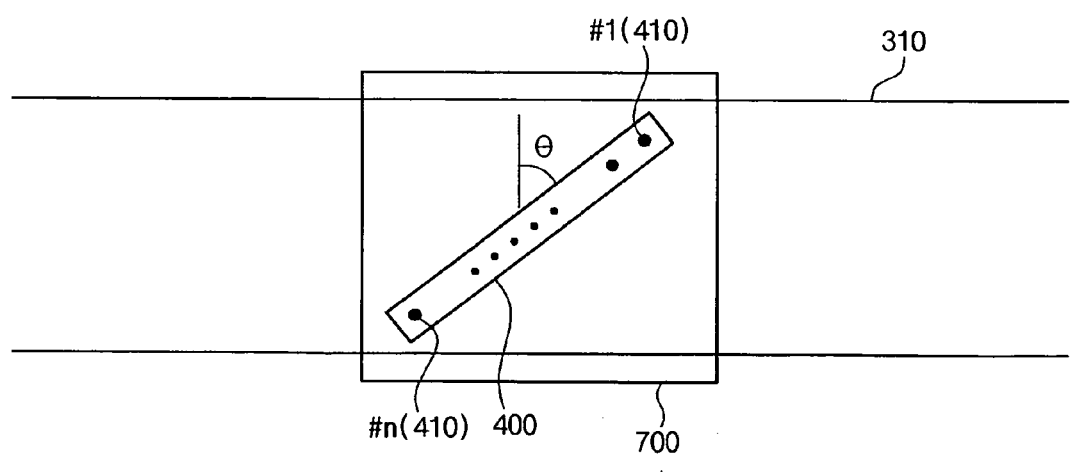
FIG. 8 is a bottom view showing a head unit of an inkjet printing system.
Figure 9:
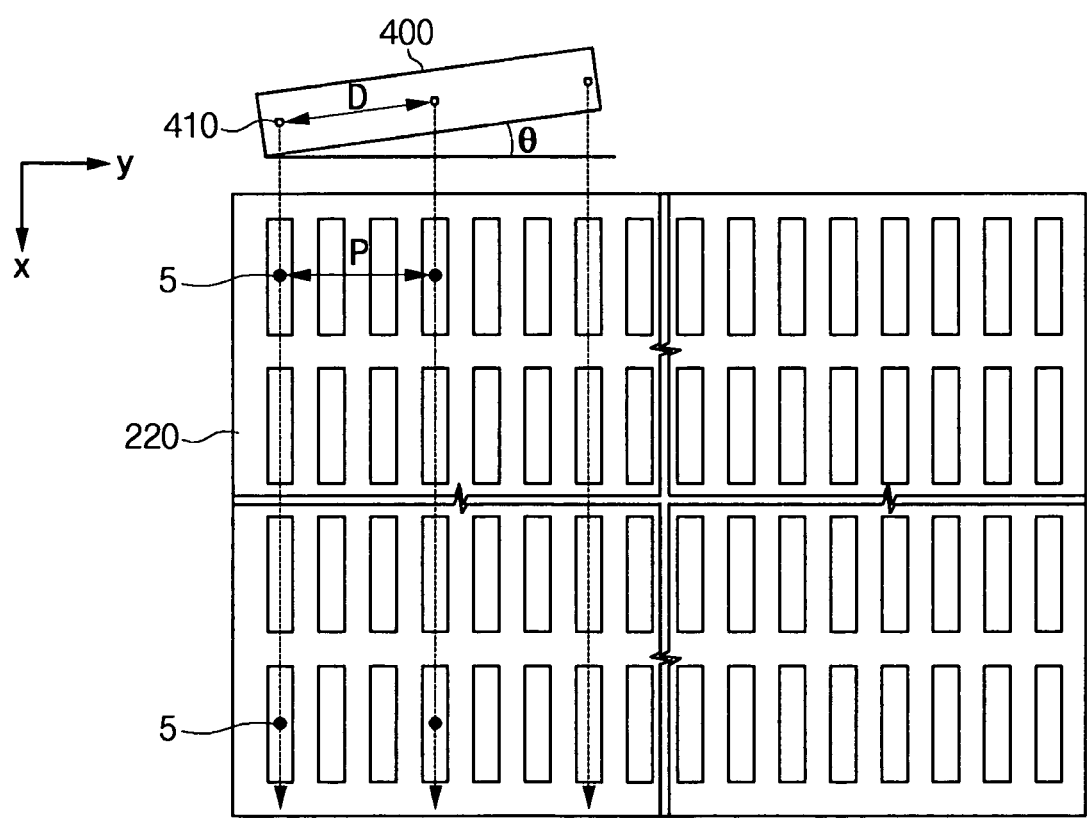
FIG. 9 is a schematic view for explaining a method of forming color filters by using an inkjet head.

As shown in FIGS. 7 to 9, the inkjet printing system used for the method of manufacturing the color filters according to the first embodiment of the present invention includes a stage 500 on which the substrate 210 is mounted, and a head unit 700 that is separated by a predetermined interval from the stage 500.

Preferably, the head unit 700 includes an inkjet head 400 and a sensor (not shown) for adjusting a position of the inkjet head 400. The inkjet head 400 has a shape of a long bar and includes a plurality of nozzles #1, #2, . . . , and #n (410) that are disposed on a bottom surface thereof.

The head unit 700 sprays ink 5 for the color filters through at least one of the nozzles 410 onto the substrate 210. A carrying unit 300 connected to the head unit 700 carries the head unit 700 to a predetermined position.

The carrying unit 300 includes a supporting portion 330 for supporting the head unit 700 above the substrate 210 such that the head unit 700 can be separated by a predetermined interval from the substrate 210, a horizontal carrying portion 310 for carrying the head unit 700 in the X or Y direction, and a lifting portion 340 for moving the head unit 700 upwardly or downwardly.

In order to form the color filters 230 on the substrate 210 mounted on the stage 500, the head unit 700 is carried in the X direction by the carrying unit 300, and the ink 5 is sprayed through the nozzles 410 of the inkjet head 400. The spraying of the ink 5 to the predetermined positions of the substrate 210 forms the color filters 230 between the light-blocking members 220 of the black matrix.

The inkjet head 400 is designed to be slanted with respect to the Y direction by a predetermined angle θ. A nozzle pitch D, which is a distance between adjacent nozzles of the inkjet head, is different from a pixel pitch P, which is a distance between adjacent pixels that are to be printed. Therefore, as described above, the inkjet head 400 is designed to rotate by the predetermined angle θ, so that a distance between adjacent positions at which the ink 5 is sprayed through the adjacent nozzles 410 can be equal to the pixel pitch P.

Now, an LCD according to the second embodiment of the present invention will be described in detail with reference to the cross-sectional view of FIG. 10.

Figure 10:
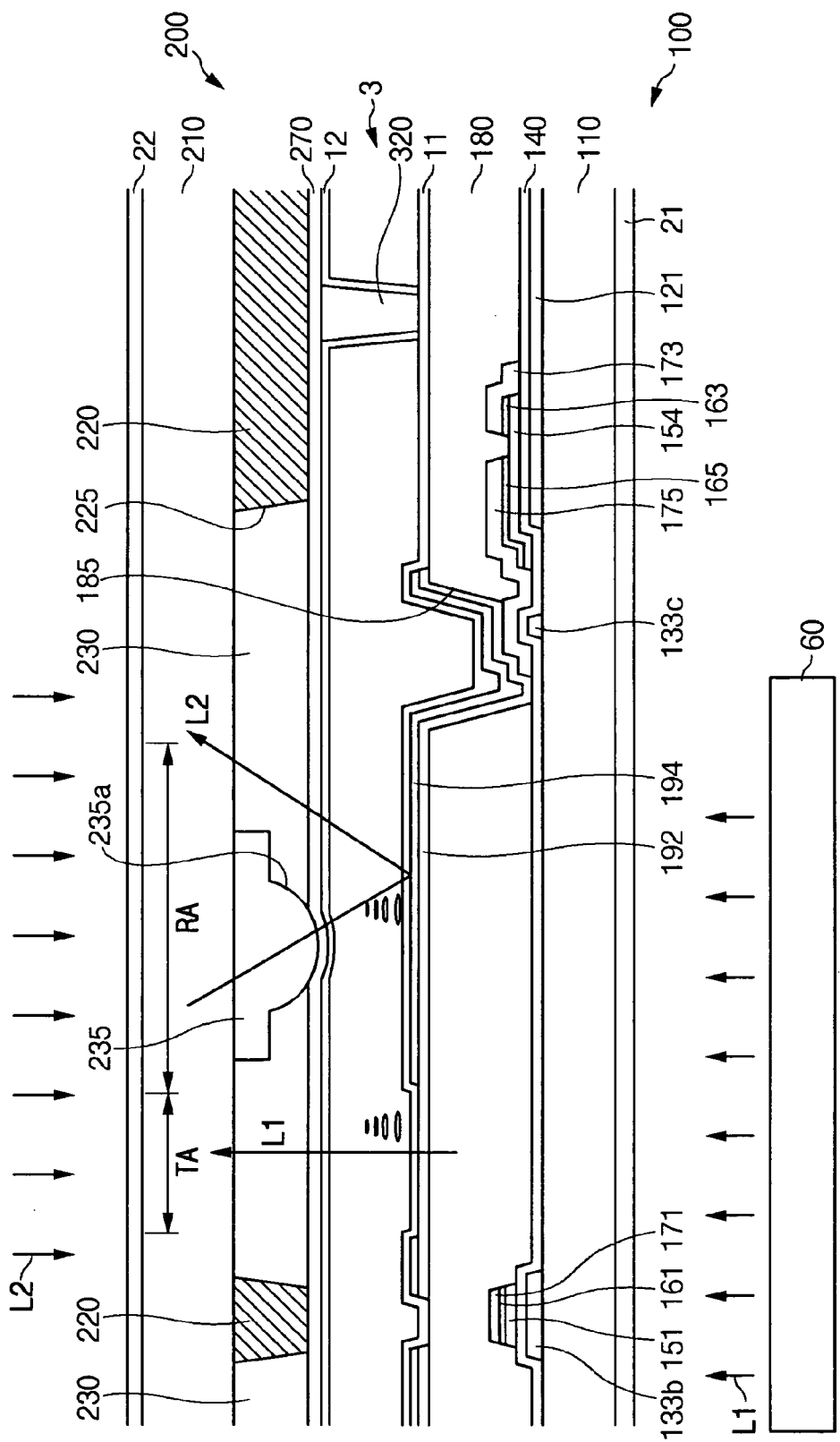
FIG. 10 is a cross-sectional view showing a liquid crystal display according to a second embodiment of the present invention.

As shown in FIG. 10, the LCD according to the second embodiment is different from the LCD shown in FIG. 4 according to the first embodiment in that convex-shaped members 235a are formed on surfaces of the transparent organic layers 235.

According to the second embodiment, after the ink 5 for the color filters 230 is sprayed by using the inkjet printing system, the ink 5 can easily flow over the substrate 210 without remaining on the transparent organic layers 235, so that the color filters 230 can be planarized.

When the transparent organic layers 235 have a flat surface, the ink 5 may tend to puddle more on the transparent organic layers 235, so the levels of the color filters 230 formed on the transparent organic layers 235 may be higher than the levels of the color filters 230 formed on regions where the transparent organic layers are not provided. In order to prevent occurrence of the level difference, the convex-shaped members 235a are formed on the transparent organic layers 235 so as to allow the ink 5 to easily flow down from the transparent organic layers 235.

Now, an LCD according to the third embodiment of the present invention will be described in detail with reference to the cross-sectional view of FIG. 11.

As shown in FIG. 11, in the LCD according to the third embodiment of the present invention, light-blocking members 220 and transparent organic layers 235 are formed on a substrate 210, and a first common electrode 271 is formed on the substrate 210, the light-blocking members 220, and the transparent organic layers 235.

By using an inkjet printing system, color filters 230 are formed within openings 225 between the light-blocking members 220. Some portions of the first common electrode 271 corresponding to the openings 225 are covered with the color filters 230, and other portions of the first common electrode 271 are not covered with the color filters 230.

A second common electrode 272 is formed on the color filters 230 and the exposed portions of the first common electrode 271. Portions 272a are cut from regions of the second common electrode 272, exposing the color filters 230 corresponding to the transparent organic layers 235.

Accordingly, a distance d1 between the common electrode 270 and the pixel electrode 190 in the transmissive area TA is different from a distance d2 between the common electrode 270 and the pixel electrode 190 in the reflective area RA. In the transmissive area TA, since the second common electrode 272 is closest to the pixel electrode 190, the pixel voltage can be determined by the second common electrode 272 and the pixel electrode 190. On the other hand, in the reflective area RA, since the first common electrode 271 is closest to the pixel electrode 190, the pixel voltage can be determined by the first common electrode 271 and the pixel electrode 190.

As such, different voltages are applied to the transmissive and reflective areas TA and RA by using step differences of the transparent organic layers 235 formed in the reflective area RA, so that it is possible to compensate for a difference in optical characteristics of the liquid crystal molecules in the transmissive and reflective areas TA and RA in the transflective LCD. In other words, unlike the first light L1 generated by the backlight unit 60, the second light L2 from the reflective area RA undergoes phase retardation caused by the liquid crystal layer 3 twice, so that a difference of the phase retardation between the transmissive and reflective areas TA and RA occurs. The problem with the occurrence of the difference of phase retardation can be solved by applying different voltages to the transmissive and reflective areas TA and RA, so that it is possible to obtain uniform phase retardation in the transmissive and reflective areas TA and RA.

For a color filter array panel, a liquid crystal display having the color filter array panel, and a method of manufacturing the color filter array panel according to the embodiments of the present invention, it is possible to planarize the color filters and improve color characteristics of a reflective area by forming the color filters using an inkjet printing system.

Although exemplary embodiments and modified examples of the present invention have been described herein, the present invention is not limited thereto, and may be modified in various forms without departing from the scope of the appended claims, the detailed description, and the accompanying drawings of the present invention. Therefore, it is natural that such modifications belong to the scope of the present invention.

What is claimed is:

1. A color filter array panel comprising:
   a substrate;
   a light-blocking member that is disposed on the substrate and has an opening;
   a transparent layer that is formed on the substrate;
   a convex-shaped member disposed on the transparent layer;
   a color filter that is disposed on the substrate and on the transparent layer; and
   a common electrode that is disposed on the color filter and the light-blocking member,
   wherein the surface of the color filter is level with the surface of the light-blocking member, and
   wherein a highest point of the convex-shape member is equal to or higher than the surface of the color filter.

2. The color filter array panel of claim 1, wherein the transparent layer and the color filter are made of a material that has a hydrophilic type of characteristic, and
   the light-blocking member is made of a material that has a hydrophobic type of characteristic.

3. The color filter array panel of claim 1, wherein the transparent layer is made of an organic material.

4. The color filter array panel of claim 1, wherein the transparent layer and the color filter are disposed within the opening of the light blocking member.

5. A liquid crystal display comprising:
a transistor array panel on which a transparent electrode and a reflective electrode are disposed;
a color filter array panel comprising a substrate, a light-blocking member that is disposed on the substrate and that has an opening, a transparent layer that is formed on the substrate, a convex-shaped member disposed on the transparent layer, a color filter that is disposed on the substrate and on the transparent layer, and a common electrode that is disposed on the color filter and the light-blocking member, wherein the surface of the color filter is level with the surface of the light-blocking member; and
a liquid crystal layer interposed between the transistor array panel and the color filter array panel,
wherein the transparent layer is disposed at a position corresponding to the reflective electrode, and
a highest point of the convex-shape member is equal to or higher than the surface of the color filter.

6. The liquid crystal display of claim 5, wherein an area of each transparent layer is 1% to 90% of an area of the reflective electrode.

7. The liquid crystal display of claim 5, wherein the transparent layer is made of an organic material.

8. The liquid crystal display of claim 5, wherein the transparent layer and the color filter are disposed within the opening of the light blocking member.

9. A method of manufacturing a color filter array panel, comprising:
forming a light-blocking member having an opening on a substrate;
forming a transparent layer on the substrate;
forming a convex-shaped member on the transparent layer;
forming a color filter by spraying ink for the color filter on the transparent layer; and
forming a common electrode on the color filter and the light-blocking member,
wherein a highest point of the convex-shape member is equal to or higher than the surface of the color filter.

10. The method of claim 9, wherein the ink for the color filters is sprayed using a nozzle of an inkjet head.

11. The method of claim 10, wherein the nozzle is disposed on a bottom surface of the inkjet head.

12. The method of claim 11, wherein the ink jet head includes a plurality of nozzles and wherein a distance between adjacent positions at which the ink is sprayed through adjacent nozzles is controlled to be equal to a pixel pitch of the substrate by adjusting a slant angle of the inkjet head.

13. The method of claim 9, wherein the transparent layer is made of an organic material.

14. The method of claim 9, wherein the transparent layer and the color filter are formed within the opening of the light blocking member.

15. A color filter array panel comprising:
a substrate;
a light-blocking member that is disposed on the substrate and that has an opening;
a transparent layer that is formed on the substrate;
a first common electrode that is disposed on the substrate, the transparent layer, and the light-blocking member;
a color filter that is disposed on the first common electrode; and
a second common electrode that is disposed on the color filter and the light-blocking member,
wherein the surface of the color filter is level with the surface of the light-blocking member.

16. The color filter array panel of claim 15, wherein the second common electrode has a cut portion that is formed at a position corresponding to the transparent layer.

17. The color filter array panel of claim 16, wherein the transparent layer and the color filter are made of a material that has a hydrophilic type of characteristic, and
the light-blocking member is made of a material that has a hydrophobic type of characteristic.

18. The color filter array panel of claim 15, wherein the transparent layer is made of an organic material.

19. The color filter array panel of claim 15, wherein the transparent layer and the color filter are disposed within the opening of the light blocking member.

20. A liquid crystal display comprising:
a transistor array panel on which a transparent electrode and a reflective electrode are disposed;
a color filter array panel comprising a substrate, a light-blocking member that is disposed on the substrate and has an opening, a transparent layer that is formed on the substrate, a first common electrode that is disposed on the substrate, the transparent layer, and the light-blocking member, a color filter that is disposed on the first common electrode, and a second common electrode that is disposed on the color filter and the light-blocking member, wherein the surface of the color filter is level with the surface of the light-blocking member; and
a liquid crystal layer interposed between the transistor array panel and the color filter array panel, wherein the transparent layer is disposed at a position corresponding to the reflective electrode.

21. The liquid crystal display of claim 20, wherein the second common electrode has a cut portion that is formed at a position corresponding to the transparent layer.

22. The liquid crystal display of claim 20, wherein an area of the transparent layer is 1% to 90% of an area of the reflective electrode.

23. The liquid crystal display of claim 22, wherein a distance between the reflective electrode and the first common electrode disposed on the transparent layer is larger than a distance between the transparent electrode and the second common electrode.

24. The liquid crystal display of claim 20, wherein the transparent layer is made of an organic material.

25. The liquid crystal display of claim 20, wherein the transparent layer and the color filter are disposed within the opening of the light blocking member.

26. A method of manufacturing a color filter array panel, comprising:
forming a light-blocking member having an opening on a substrate;
forming a transparent layer on the substrate;
forming a first common electrode on the substrate, the transparent layer, and the light-blocking member; and
forming a color filter by spraying ink for the color filter on the transparent layer, the first common electrode and the light-blocking member,
wherein the surface of the color filter is level with the surface of the light-blocking member.

27. The method of claim 26, wherein the ink for the color filter is sprayed using a nozzle of an inkjet head.

28. The method of claim 27, wherein the nozzle is disposed on a bottom surface of the inkjet head.

29. The method of claim 28, wherein the ink jet head includes a plurality of nozzles and wherein a distance between adjacent positions at which the ink is sprayed through adjacent nozzles is controlled to be equal to a pixel pitch on the substrate by adjusting a slant angle of the inkjet head.

30. The method of claim 26, wherein the transparent layer is made of an organic material.

31. The method of claim 26, wherein the transparent layer and the color filter are formed within the opening of the light blocking member.

32. The method of claim 26, further comprising
    second common electrode formed on the color filter and the light blocking member.

* * * * *